(12) United States Patent
Anderson, Jr.

(10) Patent No.: US 12,414,555 B2
(45) Date of Patent: Sep. 16, 2025

(54) MULTIFUNCTIONAL FISHING ROD HOLDER

(71) Applicant: Kenneth Allen Anderson, Jr., Grand Rapids, MN (US)

(72) Inventor: Kenneth Allen Anderson, Jr., Grand Rapids, MN (US)

( * ) Notice: Subject to any disclaimer, the term of this patent is extended or adjusted under 35 U.S.C. 154(b) by 0 days.

(21) Appl. No.: 18/917,828

(22) Filed: Oct. 16, 2024

(65) Prior Publication Data

US 2025/0120382 A1    Apr. 17, 2025

Related U.S. Application Data (60) Provisional application No. 63/590,545, filed on Oct. 16, 2023.

(51) Int. Cl.
| | |
|---|---|
| *A01K 97/10* | (2006.01) |
| *A01K 97/12* | (2006.01) |
| *F16M 11/38* | (2006.01) |
| *F16M 11/40* | (2006.01) |

(52) U.S. Cl.
CPC ............ *A01K 97/10* (2013.01); *A01K 97/12* (2013.01); *F16M 11/38* (2013.01); *F16M 11/40* (2013.01); *F16M 2200/06* (2013.01)

(58) Field of Classification Search
CPC ................................. A01K 97/10; A01K 97/12
See application file for complete search history.

(56) References Cited

U.S. PATENT DOCUMENTS

| | | | | |
|---|---|---|---|---|
| 4,021,958 A | * | 5/1977 | Snodie | A01K 97/12 43/17 |
| 4,694,603 A | * | 9/1987 | Anderson | A01K 97/01 43/22 |
| 4,763,435 A | * | 8/1988 | Deering | A01K 97/10 43/21.2 |
| 4,918,853 A | | 4/1990 | Bascom et al. | |

(Continued)

FOREIGN PATENT DOCUMENTS

CA    2810890 A1 *    9/2013    ............ A01K 99/00

OTHER PUBLICATIONS

Staff, Maxim, This Smart Fishing Reel Messages Your Phone When You've Got a Bite, Retrieved From Internet, Posted on Apr. 4, 2019, Retrieved on Oct. 16, 2024, <URL: https://www.maxim.com/gear/smart-connect-fishing-reel-2019-4/>.

(Continued)

*Primary Examiner* — Christopher P Ellis (57) ABSTRACT

A multifunctional fishing rod holder is a device that improves the chances of attracting fish and indicates when a fish has bitten the lure. The device includes a holder base, a flexible arm, a rod-holding assembly, a sail shaft, and an indicator sail. The holder base positions the desired fishing rod next to the ice hole in any terrain. The flexible arm supports the desired fishing rod in an elevated position next to the ice hole. The rod-holding assembly secures the desired fishing rod to the flexible arm. The sail shaft securely attaches the indicator sail to the flexible arm without obstructing the attachment of the desired fishing rod to the flexible arm. The indicator sail visually indicates when a fish has bitten the lure. The indicator sail also enables the light movement of the flexible arm to move the attached fishing rod as wind impacts the indicator sail.

20 Claims, 9 Drawing Sheets

(56) References Cited

U.S. PATENT DOCUMENTS

| | | | | |
|---|---|---|---|---|
| 4,964,233 A * | 10/1990 | Benson | A01K 97/10 43/17 |
| 5,345,708 A * | 9/1994 | Loyd | A01K 97/10 43/21.2 |
| 5,473,835 A * | 12/1995 | Emett | A01K 91/065 43/26.1 |
| 5,533,295 A * | 7/1996 | Hochberger | A01K 97/10 248/512 |
| 5,987,801 A * | 11/1999 | Anderson | A01K 97/01 43/17 |
| 6,094,852 A * | 8/2000 | Roach | A01K 97/12 43/16 |
| 6,817,136 B2 * | 11/2004 | Novak | A01K 97/10 43/21.2 |
| 7,739,827 B2 | 6/2010 | Keller | |
| 7,946,076 B2 | 5/2011 | Gascoigne | |
| 8,276,310 B1 * | 10/2012 | Weber | A01K 97/10 43/17 |
| 8,453,371 B1 * | 6/2013 | Sullivan | A01K 97/12 43/19.2 |
| 9,282,732 B2 * | 3/2016 | Henry, Jr. | A01K 97/10 |
| 10,798,931 B1 * | 10/2020 | Canny | A01K 97/125 |
| 12,274,253 B1 * | 4/2025 | Swanto | A01K 97/12 |
| 2007/0017141 A1 * | 1/2007 | Coulman | A01K 97/01 43/17 |
| 2009/0272022 A1 * | 11/2009 | Grega | A01K 97/01 43/17 |
| 2014/0068995 A1 * | 3/2014 | Galbraith | A01K 97/12 43/17 |
| 2014/0137460 A1 * | 5/2014 | Weber | A01K 97/10 43/21.2 |
| 2015/0208633 A1 * | 7/2015 | Schramski | A01K 97/125 43/4.5 |
| 2018/0279595 A1 * | 10/2018 | Zvezdonkin | A01K 97/11 |
| 2020/0045951 A1 * | 2/2020 | Krevald | A01K 97/10 |

OTHER PUBLICATIONS

Fish Hands Free:, Retrieved From Internet, Retrieved on Oct. 16, 2024, <URL: https://www.fishhandsfree.com/>.

* cited by examiner

MULTIFUNCTIONAL FISHING ROD HOLDER

The current application claims a priority to the U.S. provisional patent application Ser. No. 63/590,545 filed on Oct. 16, 2023.

FIELD OF THE INVENTION

The present invention generally relates to fishing equipment. More specifically, the present invention discloses a multifunctional fishing rod holder that signals when a bite has occurred, vertically supports the fishing rod to prevent tangles, and prevents wind-driven snow from interfering with the triggering action.

BACKGROUND OF THE INVENTION

Ice fishing is the practice of catching fish with lines and fishhooks or spears through an opening in the ice on a frozen body of water. Ice fishing is challenging at times since trudging through deep snow on foot is hard work. Also, fish can concentrate in certain areas in winter and, as such, finding the fish may be difficult. Hence, the setup process can be long and is further complicated due to the cold weather conditions. In addition, even after the setup process is complete, waiting for the fish to bite can be difficult task. Holding a fishing rod and waiting for the fish to bite can be especially arduous in cold weather, even while wearing the proper gear. Some fishing equipment has been made available to help people safely fish in these conditions, such as ice fishing rod holders. In general, these rod holders are designed to support the fishing rod on the ice next to the ice hole so that the user does not need to hold the fishing rod while waiting for the fish to bite. However, these rod holders have many limitations that impact the effectiveness in properly catching fish.

The currently available ice fishing rod holders often lack the structural strength to maintain the fishing rod next to the ice hole in the proper position. Due to the weather conditions, the fishing rod can move and get loose which may cause several problems, such as the fishing line getting tangled. Further, most of the available fishing rod holders do not have the means to indicate to the user when the fish has bitten. The user often must rely on visual cues, such as watching the fishing rod move, to determine that the fish has bitten. This can be harder to do in harsh weather conditions, such as during low light conditions. Thus, a self-standing fishing rod holder for ice fishing that can support the fishing rod in place above the ground while waiting for the fish to bite, prevent tangles on the fishing line due to wind conditions, as well as indicate the user when a bite has occurred is necessary.

An objective of the present invention is to provide a multifunctional fishing rod holder that signals when a bite has occurred. The present invention is preferably designed for ice fishing to support the rod, reel, and other mechanical parts of the fishing rod above ice and snow to prevent tangles on the fishing line. Another objective of the present invention is to provide a collapsible base structure with gripping features that enables the present invention to be set up in various terrains. Further, another objective of the present invention is to provide an alarm mechanism that is triggered when the fish bites but does not obstruct the movement of the fishing line. Furthermore, another objective of the present invention is to provide a fishing rod holder that facilitates the removal of the fishing rod once the fish bites. Additional features and benefits of the present invention are further discussed in the sections below.

SUMMARY OF THE INVENTION

The present invention discloses a multifunctional fishing rod holder that signals when a bite has occurred, supports the rod, reel, and other mechanical parts of the fishing rod above ice and snow, and prevents tangles on the fishing line. To accomplish this, the present invention includes a collapsible base structure with gripping features that enables to set up the device in various terrains. Further, the present invention includes means to indicate to the user when a fish has bitten the bait. This can include, but is not limited to, a visual mechanism, such as a sail, that acts as a visual indicator, and an audio alarm that emits a sound alarm when the fish has bitten the bait. Furthermore, the present invention includes a sturdy mechanism that holds the fishing rod in place while also facilitating the removal of the fishing rod from the present invention once the fish has bitten the bait. Additional features can be implemented that further improve the functionality of the present invention.

DETAILED DESCRIPTION OF THE INVENTION

All illustrations of the drawings are for the purpose of describing selected versions of the present invention and are not intended to limit the scope of the present invention.

The present invention discloses a multifunctional fishing rod holder that improves the chances of attracting fish and indicates when a fish has bitten the lure. As can be seen in FIGS. 1 through 9, the present invention comprises a holder base 1, a flexible arm 10, a rod-holding assembly 13, a sail shaft 18, and an indicator sail 21. The holder base 1 is designed to position the desired fishing rod next to the ice hole in any terrain. The flexible arm 10 supports the desired fishing rod in an elevated position next to the ice hole. The rod-holding assembly 13 secures the desired fishing rod to the flexible arm 10 in such a way that the desired fishing rod can be easily removed. The sail shaft 18 enables the secure attachment of the indicator sail 21 to the flexible arm 10 without obstructing the attachment of the desired fishing rod to the flexible arm 10. The indicator sail 21 serves to visually indicate when a fish has bitten the lure. The indicator sail 21 also enables the light movement of the flexible arm 10 to move the attached fishing rod as wind impacts the indicator sail 21.

The overall arrangement of the aforementioned components enables the user to have a better experience ice fishing. As can be seen in FIGS. 1 through 9, the holder base 1 is designed as a foldable and portable structure that can be set up in any terrain as desired. To do so, the holder base 1 comprises a 4-way tee fitting 2, a static leg 7, a first dynamic leg 8, and a second dynamic leg 9. The 4-way tee fitting 2 enables the secure assembly of the holder base 1 to form a foldable and portable structure. The static leg 7, the first dynamic leg 8, the second dynamic leg 9, and the static leg 7 serve to form a stable support that can be folded to facilitate storage and transportability. Further, the flexible arm 10 corresponds to an elongated sturdy structure that can bend to position the desired fishing rod at the appropriate orientation to attract the fish. So, the flexible arm 10 comprises a proximal arm end 11 and a distal arm end 12 corresponding to the opposite terminal ends of the flexible arm 10. Similarly, the sail shaft 18 is an elongated sturdy structure that supports the indicator sail 21 in such a way that the indicator sail 21 can engage the wind flow. So, the sail shaft 18 comprises a spring-loaded shaft end 19 and a free shaft end 20 corresponding to the terminal ends of the sail shaft 18.

In the preferred embodiment, the present invention can be arranged as follows: the rod-holding assembly 13 is mounted onto the distal arm end 12 to secure the rod-holding assembly 13 to the flexible arm 10, as can be seen in FIGS. 1 through 9. On the other hand, the 4-way tee fitting 2 is mounted onto the proximal arm end 11 to secure the flexible arm 10 to the 4-way tee fitting 2. This way, the rod-holding assembly 13 is positioned as far as possible from the 4-way tee fitting 2 so that when the desired fishing rod is mounted onto the rod-holding assembly 13, the desired fishing rod is kept elevated from the ground. Further, the flexible arm 10, the static leg 7, and the first dynamic leg 8 are orthogonally mounted to each other by the 4-way tee fitting 2 to form an overall pyramid structure that provides lateral support to the flexible arm 10 when set up. Likewise, the flexible arm 10, the static leg 7, and the second dynamic leg 9 are orthogonally mounted to each other by the 4-way tee fitting 2 to also form an overall pyramid structure that provides lateral support to the flexible arm 10 when set up. Thus, the flexible arm 10 can only flex in the direction aligned with the static leg 7 when holding the desired fishing line.

As can be seen in FIGS. 1 through 9, the flexible arm 10 is arranged so that the rod-holding assembly 13 is oriented towards the static leg 7. This way, when the desired fishing rod is mounted onto the rod-holding assembly 13, the flexible arm 10 flexes towards the static leg 7 without the desired fishing rod touching the ground. Further, the spring-loaded shaft end 19 is laterally connected to the flexible arm 10, offset from the rod-holding assembly 13, so that the sail shaft 18 is connected to the flexible arm 10. The spring-loaded shaft end 19 allows the sail shaft 18 to move when the wind flow hits the indicator sail 21. In addition, the sail shaft 18 is oriented away from the static leg 7 so that neither the sail shaft 18 nor the indicator sail 21 does not obstruct the desired fishing rod. Furthermore, the indicator sail 21 is mounted onto the free shaft end 20 to secure the indicator sail 21 to the sail shaft 18. In the preferred embodiment, the indicator sail 21 is large enough to engage the wind flow without weighting down the flexible arm 10 to prevent the desired fishing rod from touching the ground. In addition, the indicator sail 21 is designed so that the indicator sail 21 can be visible in different weather conditions. In other embodiments, the present invention can be arranged to support other fishing equipment along with the desired fishing rod.

As previously discussed, the holder base 1 is designed as a foldable structure that facilitates the transportation and storage of the device. As can be seen in FIGS. 1 through 9, the 4-way tee fitting 2 comprises a first C-shaped socket 3, a second C-shaped socket 4, a third C-shaped socket 5, and a round socket 6. The first C-shaped socket 3, the second C-shaped socket 4, and the third C-shaped socket 5 enable the dynamic legs to be manually folded by the user, while the round socket 6 maintains the static leg 7 in a fixed position. So, the round socket 6, the first C-shaped socket 3, and the second C-shaped socket 4 are positioned coplanar to each other to form an overall straight base structure for the present invention. The first C-shaped socket 3 and the second C-shaped socket 4 are positioned opposite to each other about the 4-way tee fitting 2 to receive the first dynamic leg 8 and the second dynamic leg 9, respectively. The first C-shaped socket 3 and the second C-shaped socket 4 are also positioned perpendicular to the round socket 6 due to the 4-way tee fitting 2 structure design.

In addition, the third C-shaped socket 5 is oriented geometrically normal to the round socket 6, the first C-shaped socket 3, and the second C-shaped socket 4 to complete the 4-way tee fitting 2, as can be seen in FIGS. 1 through 9. Further, the static leg 7 is mounted into the round socket 6 to secure the static leg 7 to the 4-way tee fitting 2, which keeps the static leg 7 in a fixed position relative to the 4-way tee fitting 2. On the other hand, the first dynamic leg 8 is hingedly connected into the first C-shaped socket 3 to secure the first dynamic leg 8 to the 4-way tee fitting 2. Likewise, the second dynamic leg 9 is also hingedly connected into the second C-shaped socket 4 to secure the second dynamic leg 9 to the 4-way tee fitting 2. Thus, the first dynamic leg 8 and the second dynamic leg 9 can be folded towards the static leg 7 as desired by the user. Furthermore, the flexible arm 10 is also hingedly connected into the third C-shaped socket 5, which allows the flexible arm 10 to also be folded towards the static leg 7 when desired by the user for storage and transportability.

As previously discussed, the foldable design of the holder base 1 allows the user to set the present invention into different configurations. As can be seen in FIGS. 1 through 6, in a rod-holding configuration, the flexible arm 10, the static leg 7, the first dynamic leg 8, and the second dynamic leg 9 are arranged to support the desired fishing rod. In addition, due to the additional load from the desired fishing rod on the flexible arm 10, the present invention may further comprise a locking sleeve 22 that prevents the flexible arm 10 from folding down accidentally. The locking sleeve 22 is preferably a tubular hollow device that can be selectively engaged with the third C-shaped socket 5 to ensure that the flexible arm 10 stays in the upright position when holding the desired fishing rod. So, in the rod-holding configuration, the first dynamic leg 8 and the second dynamic leg 9 are positioned perpendicular to the static leg 7. In addition, the first dynamic leg 8 and the second dynamic leg 9 are positioned colinear to each other to form a triangular structure to support the desired fishing rod. Further, the flexible arm 10 is oriented geometrically normal to the static leg 7, the first dynamic leg 8, and the second dynamic leg 9 to orient the flexible arm 10 upwards. This way, the rod-holding assembly 13 is elevated to receive the desired fishing rod. Furthermore, the locking sleeve 22 is laterally positioned around the hinged connection between the flexible arm 10 and the second C-shaped socket 4 to prevent the flexible arm 10 from folding down once the desired fishing rod is attached to the rod-holding assembly 13.

Figure 1:
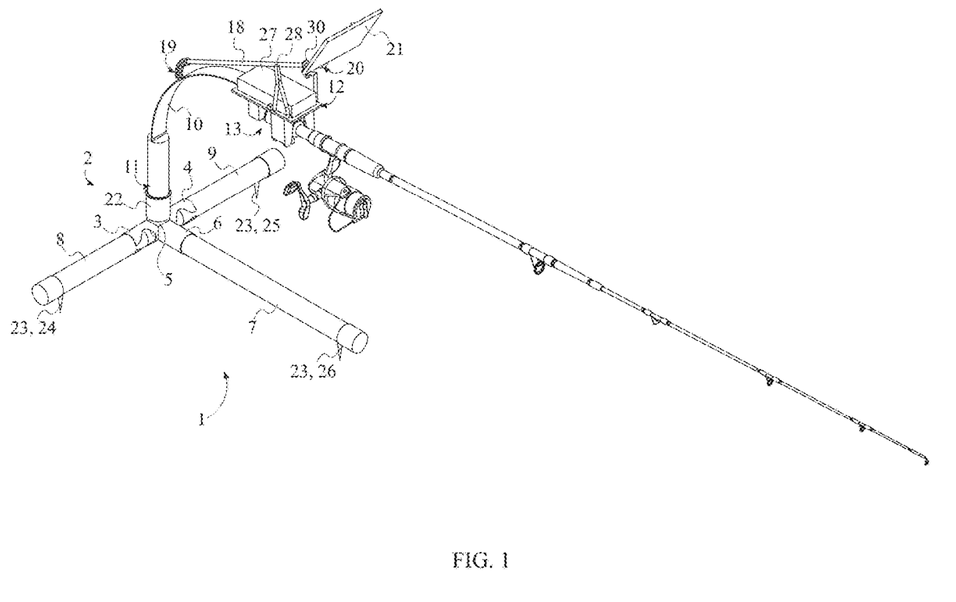
FIG. 1 is a top-front-right perspective view of the present invention, wherein the holder base is shown in the rod-holding configuration to hold a desired fishing rod, and wherein the electronic alarm and the trigger mechanism is shown in an alarm-primed configuration.
Figure 2:
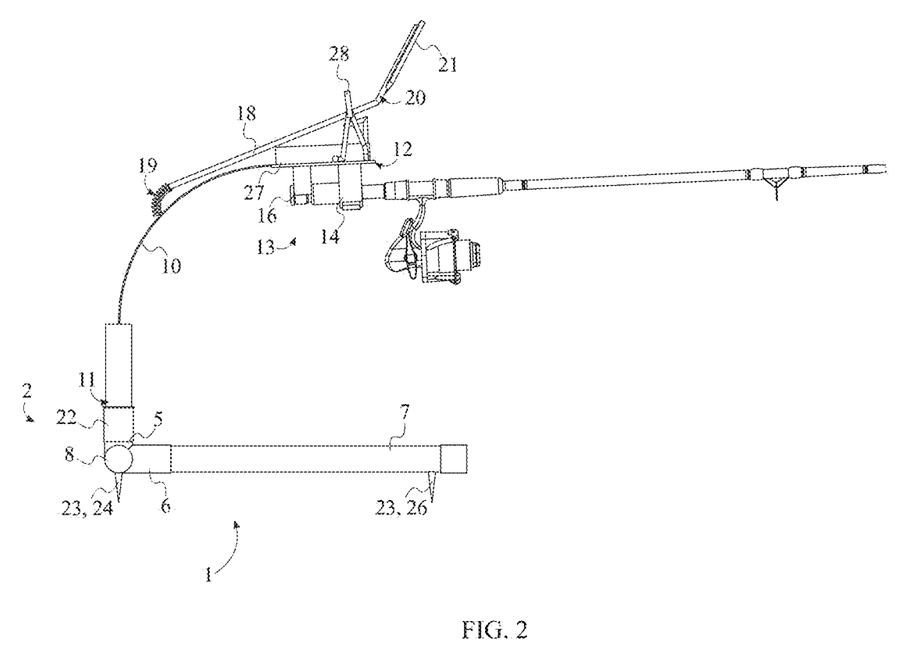
FIG. 2 is a right-side view of the present invention thereof.
Figure 3:
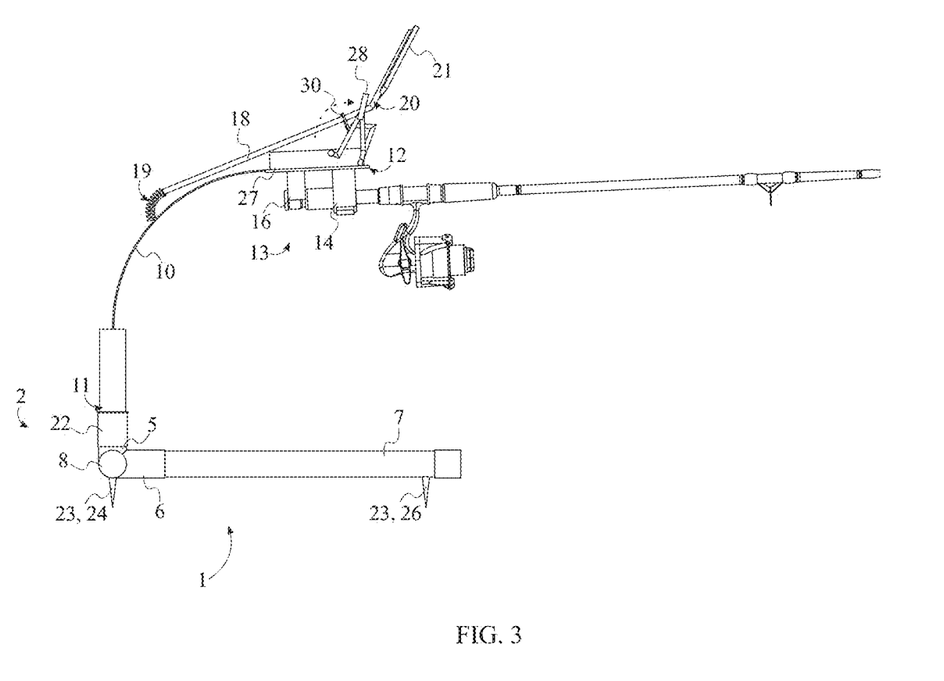
FIG. 3 is a right-side view of the present invention, wherein the electronic alarm and the trigger mechanism is shown in alarm-activated configuration.
Figure 4:
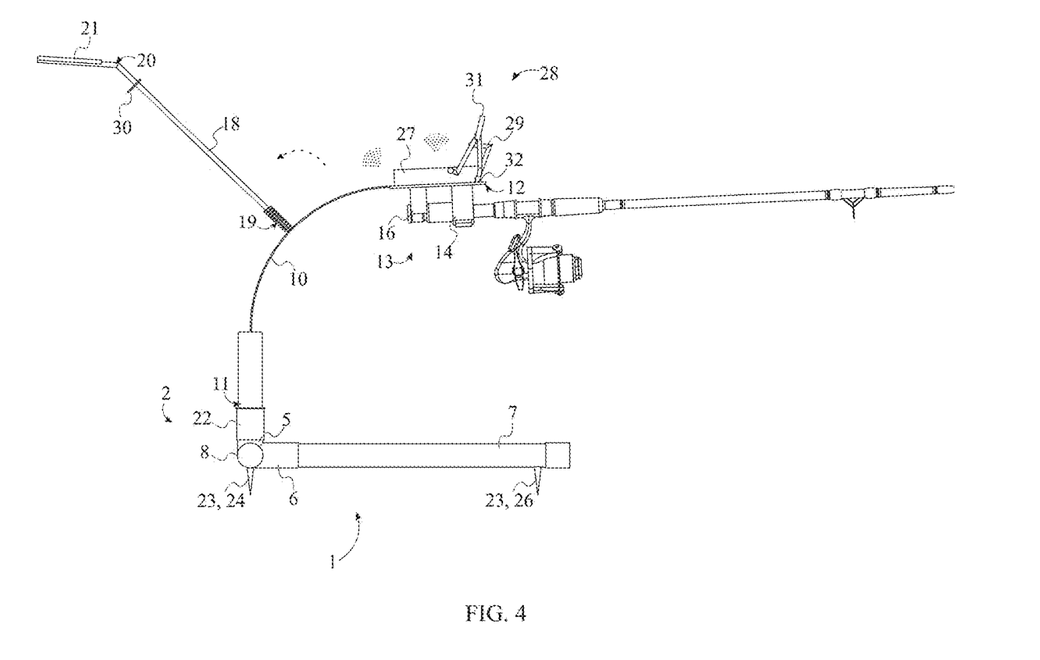
FIG. 4 is a right-side view of the present invention thereof, wherein the sail shaft is shown deployed along with the indicator sail, and wherein the electronic alarm is shown emitting a sound alert.
Figure 5:
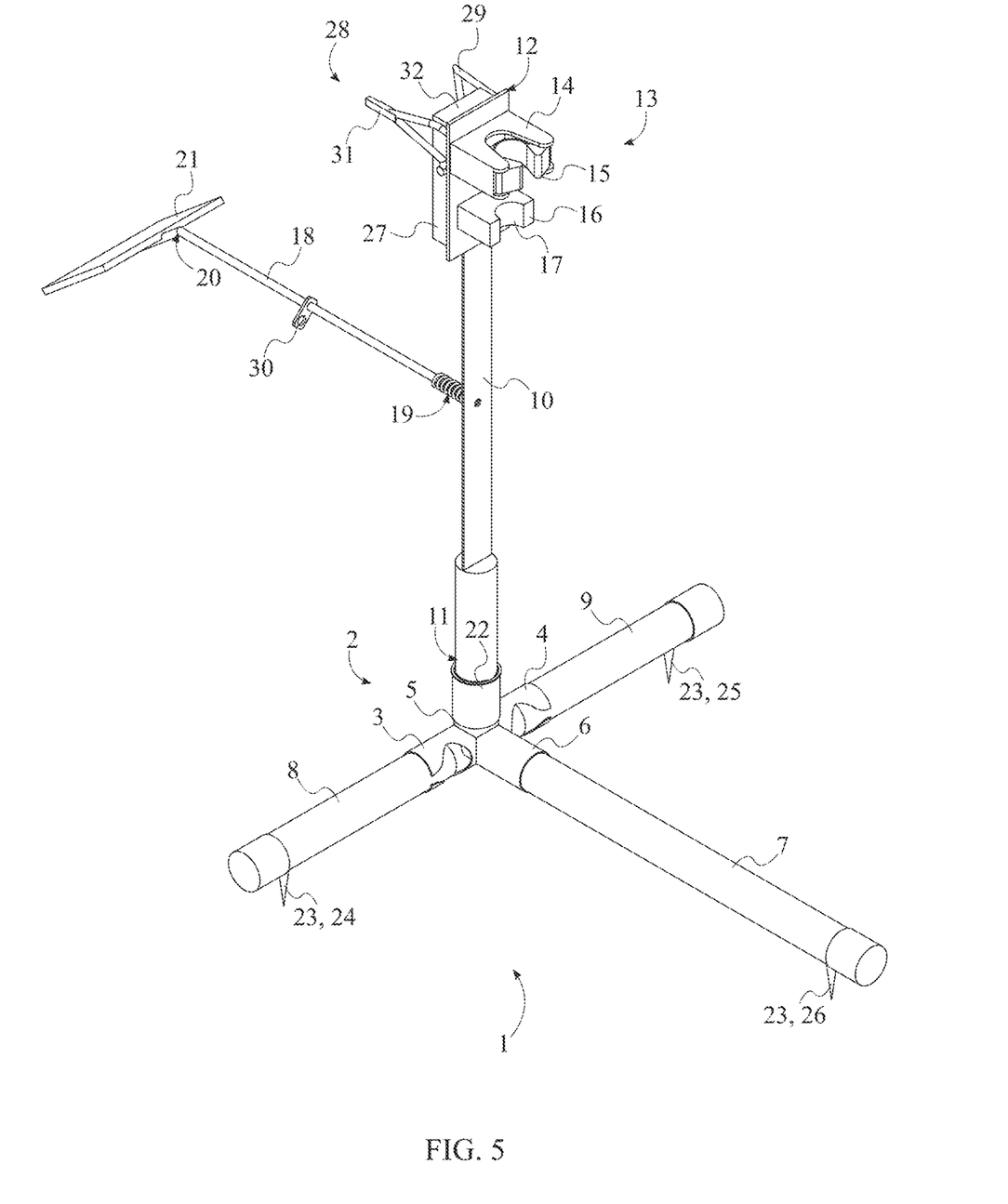
FIG. 5 is a top-front-right perspective view of the present invention, wherein the holder base is shown in the rod-holding configuration, and wherein the present invention is shown without the desired fishing rod.
Figure 6:
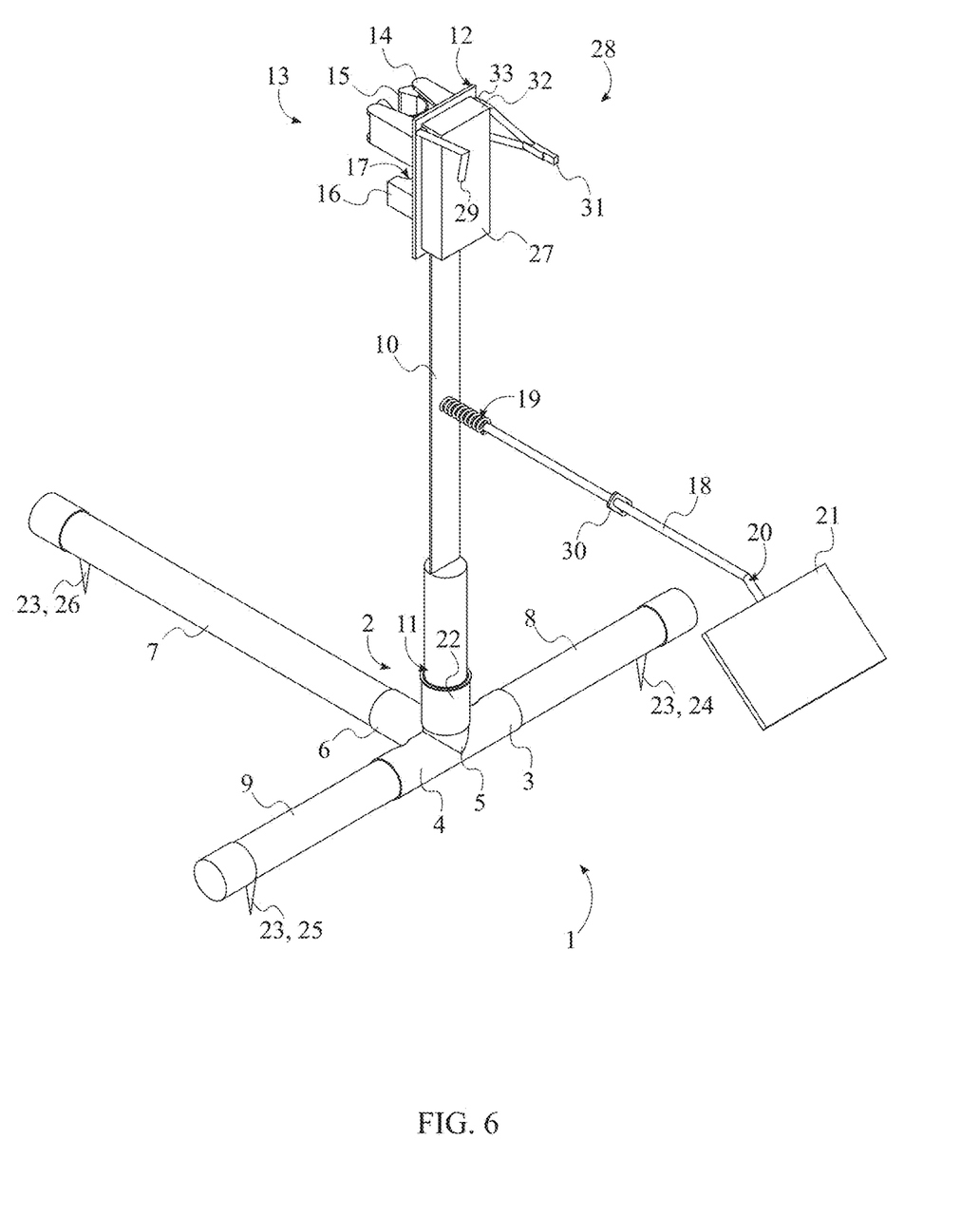
FIG. 6 is a top-rear-left perspective view of the present invention thereof.
Figure 7:
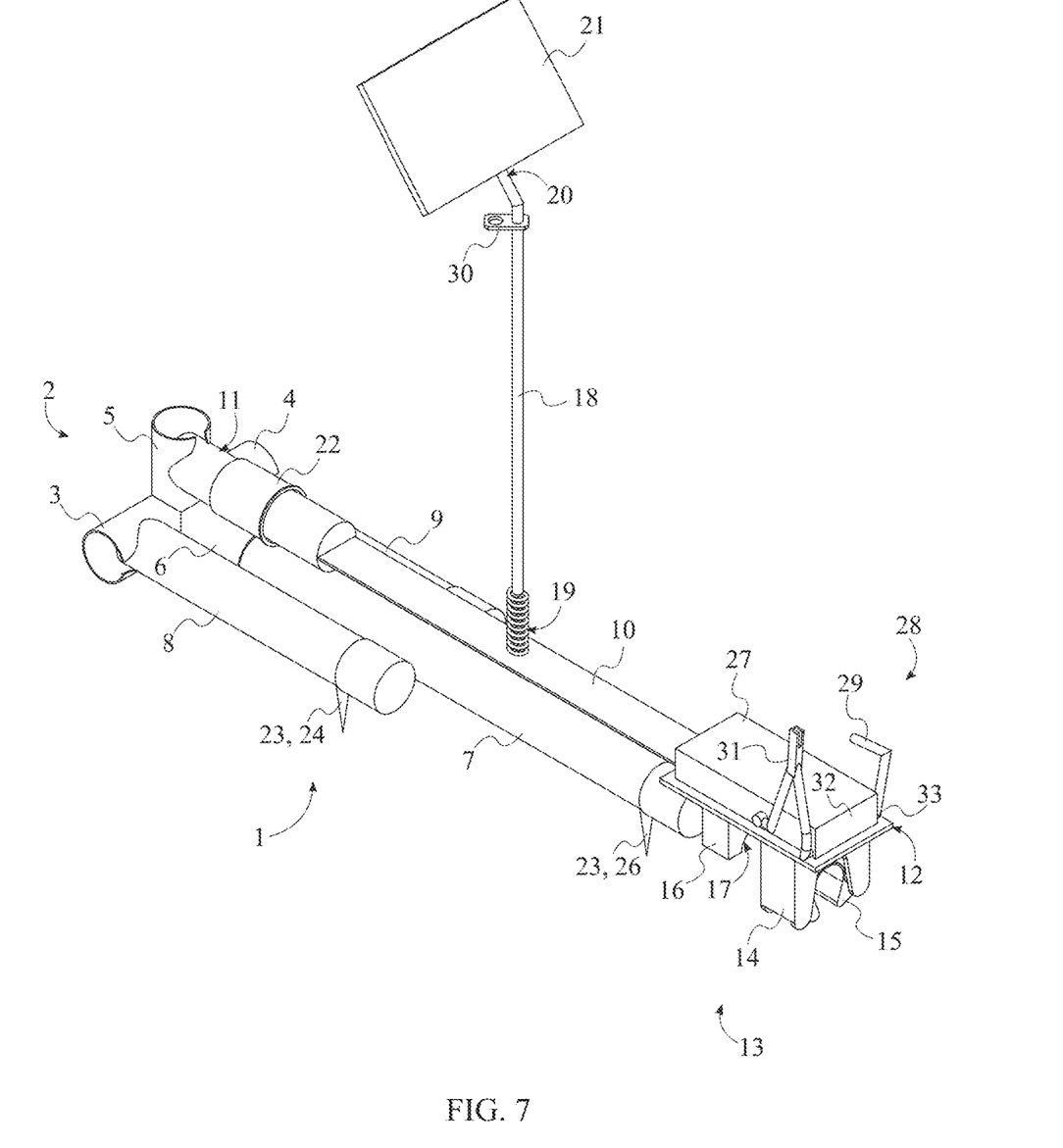
FIG. 7 is a top-front-right perspective view of the present invention, wherein the holder base is shown in a storage configuration.
Figure 8:
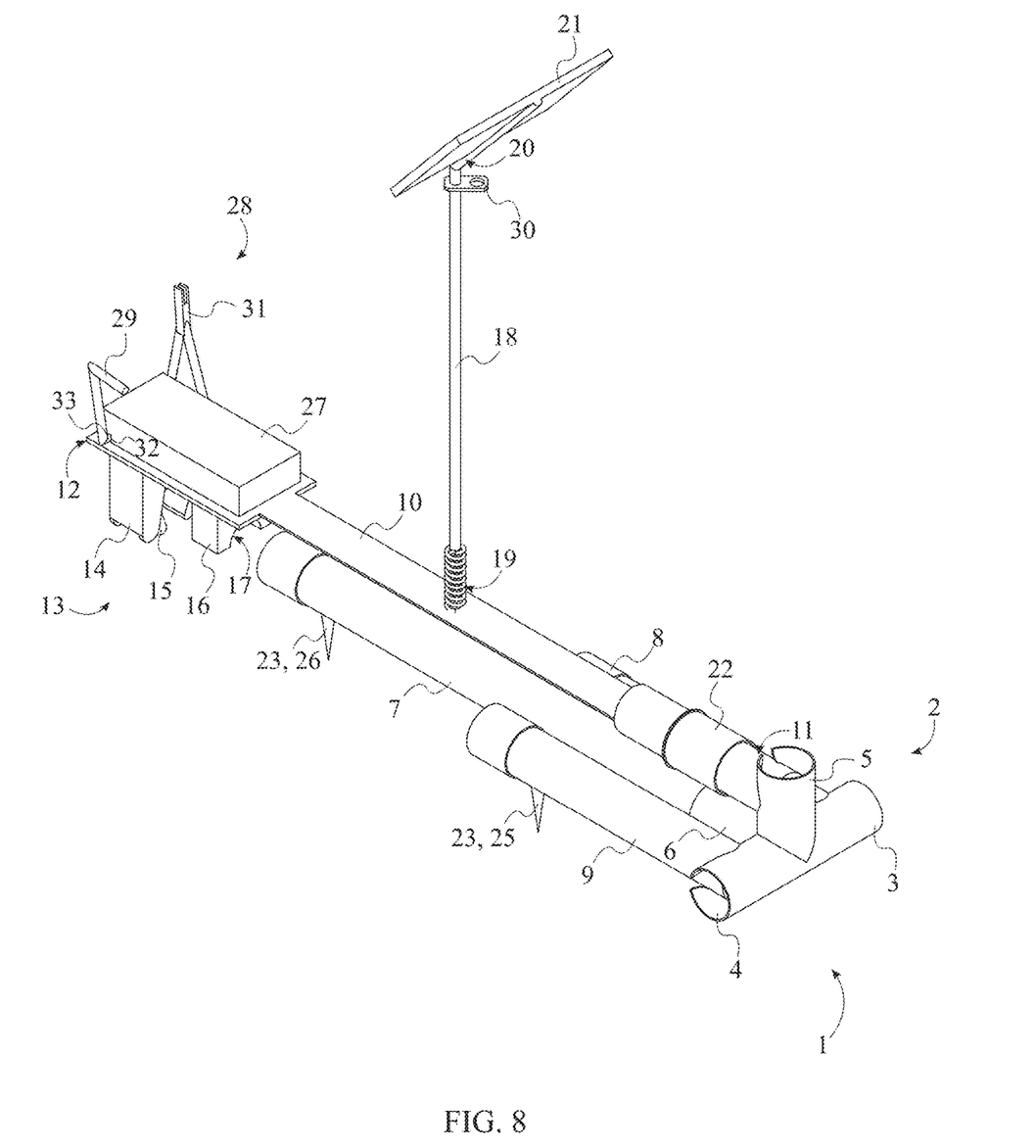
FIG. 8 is a top-rear-left perspective view of the present invention thereof.
Figure 9:
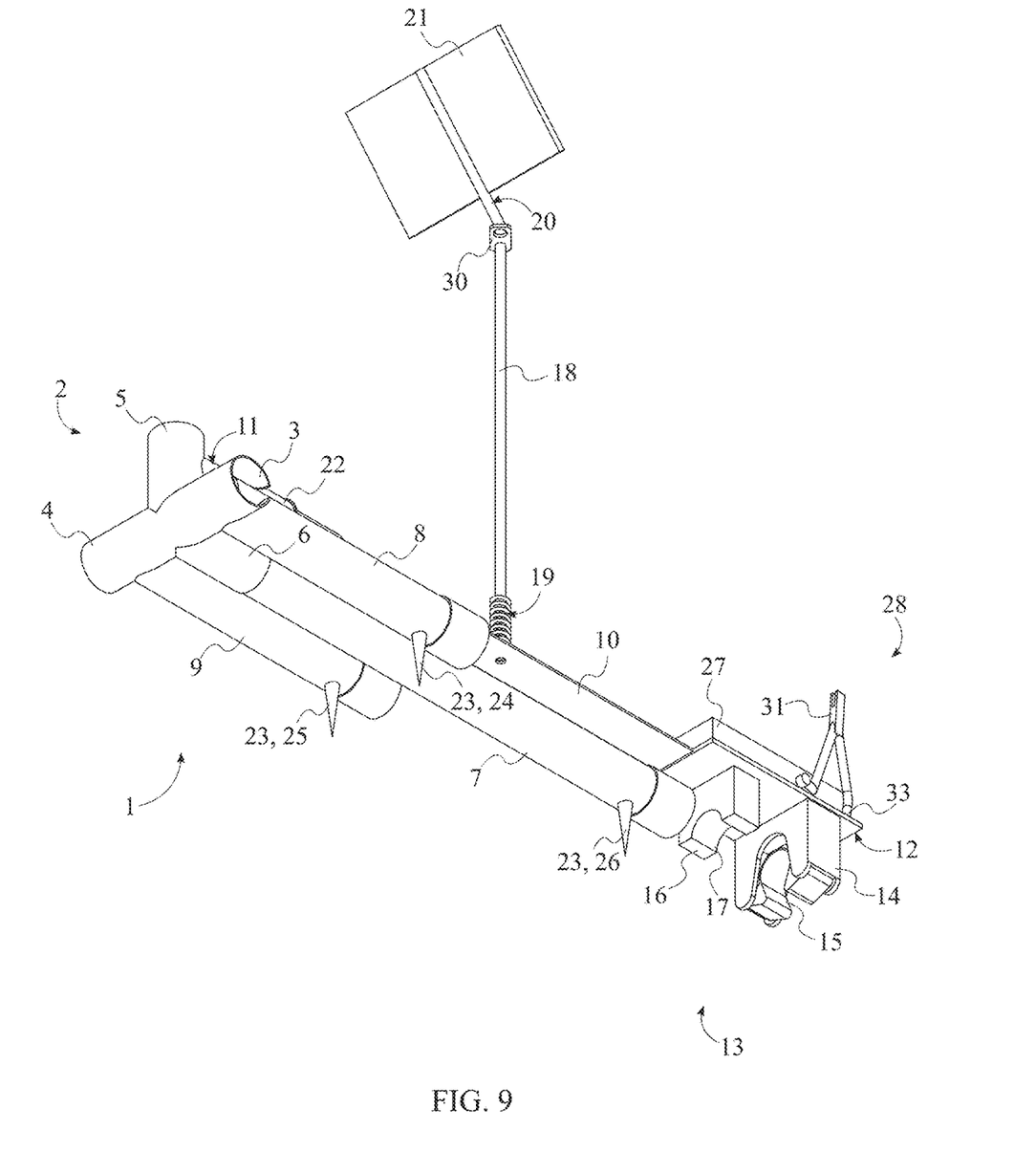
FIG. 9 is a bottom-rear-right perspective view of the present invention thereof.

Alternatively, the present invention can be arranged for storage and transportability. As can be seen in FIGS. 7 through 9, in the storage configuration, the flexible arm 10, the static leg 7, the first dynamic leg 8, and the second dynamic leg 9 are arranged so that the overall assembly takes less space and can be more easily carried by the user. To do so, the first dynamic leg 8, the second dynamic leg 9, and the flexible arm 10 are positioned parallel to the static leg 7. Once the desired fishing rod is removed from the rod-holding assembly 13, the locking sleeve 22 can be decoupled from the third C-shaped socket 5 to free the flexible arm 10. Then, the user can fold the flexible arm 10 down to position the flexible arm 10 against the static leg 7. Similarly, the first dynamic leg 8 and the second dynamic leg 9 can be moved towards static leg 7. Thus, the holder base 1 can be arranged to raise the moving parts up and out of the snow and ice yet can also be collapsed into a self-contained unit. In other embodiments, different configurations can be implemented to facilitate other functions of the present invention to accommodate other fishing equipment.

As previously discussed, the present invention is designed to be utilized in different weather conditions and terrain. As can be seen in FIGS. 1 through 9, to enable the present invention to be securely utilized in different terrain, the present invention may further comprise a plurality of stakes 23. The plurality of stakes 23 enables the holder base 1 to be secured to the ground when supporting the desired fishing rod. To do so, the plurality of stakes 23 is connected onto the holder base 1 to integrate the plurality of stakes 23 on the holder base 1. Further, each of the plurality of stakes 23 is oriented away from the flexible arm 10 so that each stake is driven into the ground once the holder base 1 is placed in the desired location to support the desired fishing rod.

As can be seen in FIGS. 1 through 9, the plurality of stakes 23 is preferably arranged to provide the maximum support to the holder base 1. In the preferred embodiment, the plurality of stakes 23 includes several stakes that are evenly distributed throughout the holder base 1. So, the plurality of stakes 23 comprises a first stake 24, a second stake 25, and a third stake 26. The first stake 24 is laterally connected to the first dynamic leg 8, offset from the 4-way tee fitting 2, to secure the first stake 24 to the free end of the first dynamic leg 8. Similarly, the second stake 25 is laterally connected to the second dynamic leg 9, offset from the 4-way tee fitting 2, to secure the second stake 25 to the free end of the second dynamic leg 9. Furthermore, the third stake 26 is laterally connected to the static leg 7, offset from the 4-way tee fitting 2, to also secure the third stake 26 to the static leg 7. Thus, the plurality of stakes 23 is evenly distributed to secure the holder base 1 to the ground.

As previously discussed, the rod-holding assembly 13 is designed to securely retain the desired fishing rod. As can be seen in FIGS. 1 through 9, the rod-holding assembly 13 may comprise a grip holder 14 and a grip brace 16. The grip holder 14 is designed to retain the handle portion of the desired fishing rod while the grip brace 16 is designed to retain the butt portion. Further, the grip holder 14 comprises a gripping surface 15 and the grip brace 16 comprises a bracing surface 17. The gripping surface 15 is a quick-release mechanism that secures the handle portion of the desired fishing rod to the grip holder 14. For example, the gripping surface 15 can be a flexible band with several integrated gripping features that engage the outer surfaces of the handle portion of the desired fishing rod. When the handle portion is engaged into the grip holder 14, the handle portion is surrounded by the gripping surface 15 to secure the handle portion within the grip holder 14. The grip strength is strong enough to keep the desired fishing rod attached to the grip holder 14 while waiting for the fish to bite, even under harsh weather conditions. However, the user can apply a greater force by moving the rod-holding assembly 13 and the handle portion away from each other to release the desired fishing rod. Further, the bracing surface 17 secures the butt portion in place to prevent the desired fishing rod from moving sideways while attached to the rod-holding assembly 13. The bracing surface 17 is an arc-shaped structure that matches the shape and size of the butt portion to engage the butt portion without completely restraining the butt portion. Thus, the desired fishing rod can be easily attached to the rod-holding assembly 13 without the use of external tools. Similarly, the desired fishing rod can be easily removed from the rod-holding assembly 13 once the fish has bitten the lure.

In the preferred embodiment, the rod-holding assembly 13 can be arranged as follows: the grip holder 14 and the grip brace 16 are laterally connected to the flexible arm 10 to secure the grip holder 14 and the grip brace 16 to the flexible arm 10, as can be seen in FIGS. 1 through 9. Both the grip holder 14 and the grip brace 16 can be directly connected to the flexible arm 10, or an intermediate structure can be implemented to secure the rod-holding assembly 13 to the flexible arm 10. Further, the grip holder 14 and the grip brace 16 are positioned collinear to each other along the flexible arm 10 so that the handle portion and the butt portion of the desired fishing rod can be simultaneously attached to both the grip holder 14 and the grip brace 16, respectively. The grip holder 14 and the grip brace 16 are also oriented towards the static leg 7 so that when the desired fishing rod is attached, the weight of the desired fishing rod bends the flexible arm 10 towards the static leg 7. Further, the grip holder 14 is positioned in between the distal arm end 12 and the grip brace 16 so that the attached fishing rod maintains the fishing line oriented towards the water. The gripping surface 15 and the bracing surface 17 are also positioned parallel to each other to maintain the attached fishing rod aligned towards the water. In other embodiments, different mechanisms can be utilized to retain the desired fishing rod in a quick release manner.

As previously discussed, the present invention includes means to alert the user when a fish has bitten the lure. In addition to the indicator sail 21, the present invention may further comprise an electronic alarm 27 and a trigger mechanism 28, as can be seen in FIGS. 1 through 9. The electronic alarm 27 is designed to emit an audible alert for the user in addition to the visual indication from the indicator sail 21. The trigger mechanism 28 enables the automatic activation of the electronic alarm 27 when the fish has bitten. The trigger mechanism 28 is preferably a mechanical system that allows the simultaneous activation of the indicator sail 21 and the electronic alarm 27 once the fish has bitten. To do so, the trigger mechanism 28 comprises a hook 29, a catch 30, a yoke 31, a setting 32, and an axle 33. The hook 29 is designed to releasably retain the sail shaft 18 against flexible arm 10 when the desired fishing rod is set to lure the fish. The catch 30 facilitates the releasable connection between the hook 29 and the sail shaft 18. The yoke 31 engages the fishing line of the desired fishing rod without obstructing the movement of the fishing line. In addition, the yoke 31 enables the automatic activation of the electronic alarm 27 when the fishing line is pulled by the caught fish. Further, the setting 32 and the axle 33 enable the simultaneous movement of the hook 29 and the yoke 31 to simultaneously activate the electronic alarm 27 and the indicator sail 21.

In the preferred embodiment, the electronic alarm 27 and the trigger mechanism 28 can be implemented as follows: the setting 32 and the electronic alarm 27 are laterally mounted to the flexible arm 10, adjacent to the distal arm end 12, to secure the setting 32 and the electronic alarm 27 to the flexible arm 10, as can be seen in FIGS. 1 through 9. The setting 32 is preferably a brace-like structure that retains the axle 33 in such a way that the axle 33 can rotate within the setting 32. Further, the hook 29 is terminally connected to the axle 33 to secure the hook 29 to the axle 33 and form a single structure. Similarly, the yoke 31 is also terminally connected to the axle 33, opposite to the hook 29, to secure the yoke 31 to the axle 33 and form a single structure with the hook 29. For example the hook 29, the axle 33, and the yoke 31 can be a single structure formed from sturdy wire with the hook 29 and the yoke 31 being oriented parallel to each other.

As can be seen in FIGS. 1 through 9, the axle 33 is further rotatably mounted through the setting 32 in such a way that the axle 33 can freely rotate within the setting 32. This way, when the yoke 31 is moved by the fishing line when the fish is caught, the hook 29 is also moved as the axle 33 transmits the torque from the yoke 31 to the hook 29. Moreover, the catch 30 is laterally mounted to the sail shaft 18, offset from the free shaft end 20, so that the catch 30 can move along the sail shaft 18. This allows the indicator sail 21 to move along with the wind flow around the indicator sail 21. In addition, the flexible arm 10 is preferably a tempered spring steel strap which allows the flexible arm 10 to flex without collapsing. As a result, the sail shaft 18 and flexible arm 10 move as a well in a rocking motion that moves the attached fishing rod to further attract the desired fish without the fishing rod hitting the ground. The flexible arm 10 also subdues any tension or resistance the fish may feel, so the fish holds onto the bait longer. Furthermore, the yoke 31 is operatively coupled to the electronic alarm 27, wherein the yoke 31 is used to activate the electronic alarm 27. For example, the yoke 31 can be connected to the electronic alarm 27 using a physical connector, such as a magnetic or mechanical switch, that allows the electronic alarm 27 to be activated when the yoke 31 is engaged to the electronic alarm 27. Once the yoke 31 moves and the physical connector is disengaged, the electronic alarm 27 is activated to emit a loud alert that the user can hear from a distance. In other embodiments, different connectors can be implemented that allow the automatic activation of the electronic alarm 27 when a fish has been caught.

In the preferred embodiment, the present invention can be deployed as follows: the holder base 1 is arranged into the rod-holding configuration so that the desired fishing rod can be attached to the rod-holding assembly 13, as can be seen in FIGS. 1 through 4. The butt portion is positioned on the grip brace 16, and the handle portion is attached to the grip holder 14. Once the desired fishing rod is attached to the rod-holding assembly 13, the user can move the indicator flag closer to the desired fishing rod by moving the sail shaft 18 against the flexible arm 10. This allows the electronic alarm 27 and the trigger mechanism 28 to be arranged in an alarm-primed configuration by linking the hook 29 to the catch 30. This also allows the yoke 31 to engage with the electronic alarm 27 to prime the electronic alarm 27. Once primed, the user can deploy the fishing line to the water along with the lure, and the fishing line can also be engaged with the yoke 31. This way, the present invention is ready to attract fish once securely placed on the ground next to the water.

Once the fish bites the lure and starts pulling on the fishing line, the electronic alarm 27 and the indicator sail 21 are triggered to alert the user that a fish has been caught. As can be seen in FIGS. 1 through 4, in an alarm-activated configuration, the hook 29 is released from the catch 30 which positions the hook 29 offset from the catch 30 due to the fishing line pulling on the yoke 31. The fishing line moves the yoke 31 away from the electronic alarm 27 to trigger the electronic alarm 27. Simultaneously, the hook 29 is rotated away from the catch 30, which in turn releases the sail shaft 18 and allows the indicator sail 21 to move and alert the user visually that a fish has been caught. Since the sail shaft 18 is connected to the flexible arm 10 via the spring-loaded shaft end 19, the indicator sail 21 keeps moving in a rocking motion which, along with the sound alert from the electronic alarm 27, help attract the user's attention so that the user can promptly come and retrieve the caught fish.

The catch 30 is preferably designed so that the catch 30 can move along the sail shaft 18 as the present invention is arranged into the different configurations as desired by the user. To enable so, the catch 30 has a tab-like structure with a shaft hole, a hook hole, and an intermediate hole. The shaft hole is preferable centered on the catch 30 with a size large enough to accommodate the sail shaft 18 that allows the catch 30 to slide along the sail shaft 18. Further, the hook hole is an opening large enough to receive the hook 29 when the trigger mechanism 28 and the electronic alarm 27 are in the alarm-activated configuration. The hook hole is large enough that enables the hook 29 to engage the catch 30 when the sail shaft 18 is bent towards the flexible arm 10 in the alarm-activated configuration. Due to the arrangement of the sail shaft 18 and the flexible arm 10, the hook 29 may not perfectly align with the hook hole, so the hook hole needs to large enough to allow the hook 29 to engage with the catch 30 at an angle. A rubber plug may be included to ensure the releasable engagement of the hook 29 with the hook hole without risk of the hook 29 from accidentally disengaging due to movements of the sail shaft 18 and/or the flexible arm 10. Furthermore, the intermediate hole is positioned between the shaft hole and the hook hole to receive the hook 29 when the present invention is arranged into the storage configuration. The intermediate hole is a hole large enough to receive the hook 29 in the storage configuration to position the sail shaft 18 against the collapsed flexible arm 10. This prevents the sail shaft 18 and the indicator sail 21 from getting tangled with other equipment when the present invention is being stored away or transported with other fishing equipment.

Although the invention has been explained in relation to its preferred embodiment, it is to be understood that many other possible modifications and variations can be made without departing from the spirit and scope of the invention.

What is claimed is:

1. A multifunctional fishing rod holder comprising:
   a holder base;
   a flexible arm;
   a rod-holding assembly;
   a sail shaft;

an indicator sail;
the holder base comprising a 4-way tee fitting, a static leg, a first dynamic leg, and a second dynamic leg;
the flexible arm comprising a proximal arm end and a distal arm end;
the sail shaft comprising a spring-loaded shaft end and a free shaft end;
the rod-holding assembly being mounted onto the distal arm end;
the 4-way tee fitting being mounted onto the proximal arm end;
the flexible arm, the static leg, and the first dynamic leg being orthogonally mounted to each other by the 4-way tee fitting;
the flexible arm, the static leg, and the second dynamic leg being orthogonally mounted to each other by the 4-way tee fitting;
the spring-loaded shaft end being laterally connected to the flexible arm, offset from the rod-holding assembly;
the sail shaft being oriented away from the static leg; and
the indicator sail being mounted onto the free shaft end.

2. The multifunctional fishing rod holder as claimed in claim 1 further comprising:
the 4-way tee fitting comprising a first C-shaped socket, a second C-shaped socket, a third C-shaped socket, and a round socket;
the round socket, the first C-shaped socket, and the second C-shaped socket being positioned coplanar to each other;
the first C-shaped socket and the second C-shaped socket being positioned opposite to each other about the 4-way tee fitting;
the first C-shaped socket and the second C-shaped socket being positioned perpendicular to the round socket;
the third C-shaped socket being oriented normal to the round socket, the first C-shaped socket, and the second C-shaped socket;
the static leg being mounted into the round socket;
the first dynamic leg being hingedly connected into the first C-shaped socket;
the second dynamic leg being hingedly connected into the second C-shaped socket; and
the flexible arm being hingedly connected into the third C-shaped socket.

3. The multifunctional fishing rod holder as claimed in claim 2 further comprising:
wherein the flexible arm, the static leg, the first dynamic leg, and the second dynamic leg are arranged into a rod-holding configuration;
a locking sleeve;
the first dynamic leg and the second dynamic leg being positioned perpendicular to the static leg;
the first dynamic leg and the second dynamic leg being positioned colinear to each other;
the flexible arm being oriented normal to the static leg, the first dynamic leg, and the second dynamic leg; and
the locking sleeve being laterally positioned around the hinged connection between the flexible arm and the third C-shaped socket.

4. The multifunctional fishing rod holder as claimed in claim 2 further comprising:
wherein the flexible arm, the static leg, the first dynamic leg, and the second dynamic leg are arranged into a storage configuration; and
the first dynamic leg, the second dynamic leg, and the flexible arm being positioned parallel to the static leg.

5. The multifunctional fishing rod holder as claimed in claim 1 further comprising:
a plurality of stakes;
the plurality of stakes being connected onto the holder base; and
each of the plurality of stakes being oriented away from the flexible arm.

6. The multifunctional fishing rod holder as claimed in claim 5 further comprising:
the plurality of stakes comprising a first stake, a second stake, and a third stake;
the first stake being laterally connected to the first dynamic leg, offset from the 4-way tee fitting;
the second stake being laterally connected to the second dynamic leg, offset from the 4-way tee fitting; and
the third stake being laterally connected to the static leg, offset from the 4-way tee fitting.

7. The multifunctional fishing rod holder as claimed in claim 1 further comprising:
the rod-holding assembly comprising a grip holder and a grip brace;
the grip holder comprising a gripping surface;
the grip brace comprising a bracing surface;
the grip holder and the grip brace being laterally connected to the flexible arm;
the grip holder and the grip brace being positioned collinear to each other along the flexible arm;
the grip holder and the grip brace being oriented towards the static leg;
the grip holder being positioned in between the distal arm end and the grip brace; and
the gripping surface and the bracing surface being positioned parallel to each other.

8. The multifunctional fishing rod holder as claimed in claim 1 further comprising:
an electronic alarm;
a trigger mechanism;
the trigger mechanism comprising a hook, a catch, a yoke, a setting, and an axle;
the setting and the electronic alarm being laterally mounted to the flexible arm, adjacent to the distal arm end;
the hook being terminally connected to the axle;
the yoke being terminally connected to the axle, opposite to the hook;
the axle being rotatably mounted through the setting;
the catch being laterally mounted to the sail shaft, offset from the free shaft end; and
the yoke being operatively coupled to the electronic alarm, wherein the yoke is used to activate the electronic alarm.

9. The multifunctional fishing rod holder as claimed in claim 8 further comprising:
wherein the electronic alarm and the trigger mechanism are arranged in an alarm-primed configuration; and
the hook being linked to the catch.

10. The multifunctional fishing rod holder as claimed in claim 8 further comprising:
wherein the electronic alarm and the trigger mechanism are arranged in an alarm-activated configuration; and
the hook being positioned offset from the catch.

11. The multifunctional fishing rod holder as claimed in claim 1, wherein the flexible arm is a tempered spring steel strap.

12. A multifunctional fishing rod holder comprising:
a holder base;
a flexible arm;

a rod-holding assembly;
a sail shaft;
an indicator sail;
a plurality of stakes;
the flexible arm being a tempered spring steel strap;
the holder base comprising a 4-way tee fitting, a static leg, a first dynamic leg, and a second dynamic leg;
the flexible arm comprising a proximal arm end and a distal arm end;
the sail shaft comprising a spring-loaded shaft end and a free shaft end;
the rod-holding assembly being mounted onto the distal arm end;
the 4-way tee fitting being mounted onto the proximal arm end;
the flexible arm, the static leg, and the first dynamic leg being orthogonally mounted to each other by the 4-way tee fitting;
the flexible arm, the static leg, and the second dynamic leg being orthogonally mounted to each other by the 4-way tee fitting;
the spring-loaded shaft end being laterally connected to the flexible arm, offset from the rod-holding assembly;
the sail shaft being oriented away from the static leg;
the indicator sail being mounted onto the free shaft end;
the plurality of stakes being connected onto the holder base; and
each of the plurality of stakes being oriented away from the flexible arm.

13. The multifunctional fishing rod holder as claimed in claim 12 further comprising:
the 4-way tee fitting comprising a first C-shaped socket, a second C-shaped socket, a third C-shaped socket, and a round socket;
the round socket, the first C-shaped socket, and the second C-shaped socket being positioned coplanar to each other;
the first C-shaped socket and the second C-shaped socket being positioned opposite to each other about the 4-way tee fitting;
the first C-shaped socket and the second C-shaped socket being positioned perpendicular to the round socket;
the third C-shaped socket being oriented normal to the round socket, the first C-shaped socket, and the second C-shaped socket;
the static leg being mounted into the round socket;
the first dynamic leg being hingedly connected into the first C-shaped socket;
the second dynamic leg being hingedly connected into the second C-shaped socket; and
the flexible arm being hingedly connected into the third C-shaped socket.

14. The multifunctional fishing rod holder as claimed in claim 13 further comprising:
wherein the flexible arm, the static leg, the first dynamic leg, and the second dynamic leg are arranged into a rod-holding configuration;
a locking sleeve;
the first dynamic leg and the second dynamic leg being positioned perpendicular to the static leg;
the first dynamic leg and the second dynamic leg being positioned colinear to each other;
the flexible arm being oriented normal to the static leg, the first dynamic leg, and the second dynamic leg; and
the locking sleeve being laterally positioned around the hinged connection between the flexible arm and the third C-shaped socket.

15. The multifunctional fishing rod holder as claimed in claim 13 further comprising:
wherein the flexible arm, the static leg, the first dynamic leg, and the second dynamic leg are arranged into a storage configuration; and
the first dynamic leg, the second dynamic leg, and the flexible arm being positioned parallel to the static leg.

16. The multifunctional fishing rod holder as claimed in claim 12 further comprising:
the plurality of stakes comprising a first stake, a second stake, and a third stake;
the first stake being laterally connected to the first dynamic leg, offset from the 4-way tee fitting;
the second stake being laterally connected to the second dynamic leg, offset from the 4-way tee fitting; and
the third stake being laterally connected to the static leg, offset from the 4-way tee fitting.

17. The multifunctional fishing rod holder as claimed in claim 12 further comprising:
the rod-holding assembly comprising a grip holder and a grip brace;
the grip holder comprising a gripping surface;
the grip brace comprising a bracing surface;
the grip holder and the grip brace being laterally connected to the flexible arm;
the grip holder and the grip brace being positioned collinear to each other along the flexible arm;
the grip holder and the grip brace being oriented towards the static leg;
the grip holder being positioned in between the distal arm end and the grip brace; and
the gripping surface and the bracing surface being positioned parallel to each other.

18. The multifunctional fishing rod holder as claimed in claim 12 further comprising:
an electronic alarm;
a trigger mechanism;
the trigger mechanism comprising a hook, a catch, a yoke, a setting, and an axle;
the setting and the electronic alarm being laterally mounted to the flexible arm, adjacent to the distal arm end;
the hook being terminally connected to the axle;
the yoke being terminally connected to the axle, opposite to the hook;
the axle being rotatably mounted through the setting;
the catch being laterally mounted to the sail shaft, offset from the free shaft end; and
the yoke being operatively coupled to the electronic alarm, wherein the yoke is used to activate the electronic alarm.

19. The multifunctional fishing rod holder as claimed in claim 18 further comprising:
wherein the electronic alarm and the trigger mechanism are arranged in an alarm-primed configuration; and
the hook being linked to the catch.

20. The multifunctional fishing rod holder as claimed in claim 18 further comprising:
wherein the electronic alarm and the trigger mechanism are arranged in an alarm-activated configuration; and
the hook being positioned offset from the catch.

* * * * *